F. W. LEUTHESSER.
STEAM, AIR, AND WATER TRAP VALVE.
APPLICATION FILED FEB. 8, 1910.

1,037,157.

Patented Aug. 27, 1912.

2 SHEETS—SHEET 1.

Witnesses:
Ephraim Banning.
W. P. Bond.

Inventor:
Fred W. Leuthesser.
By Banning & Banning
Attys.

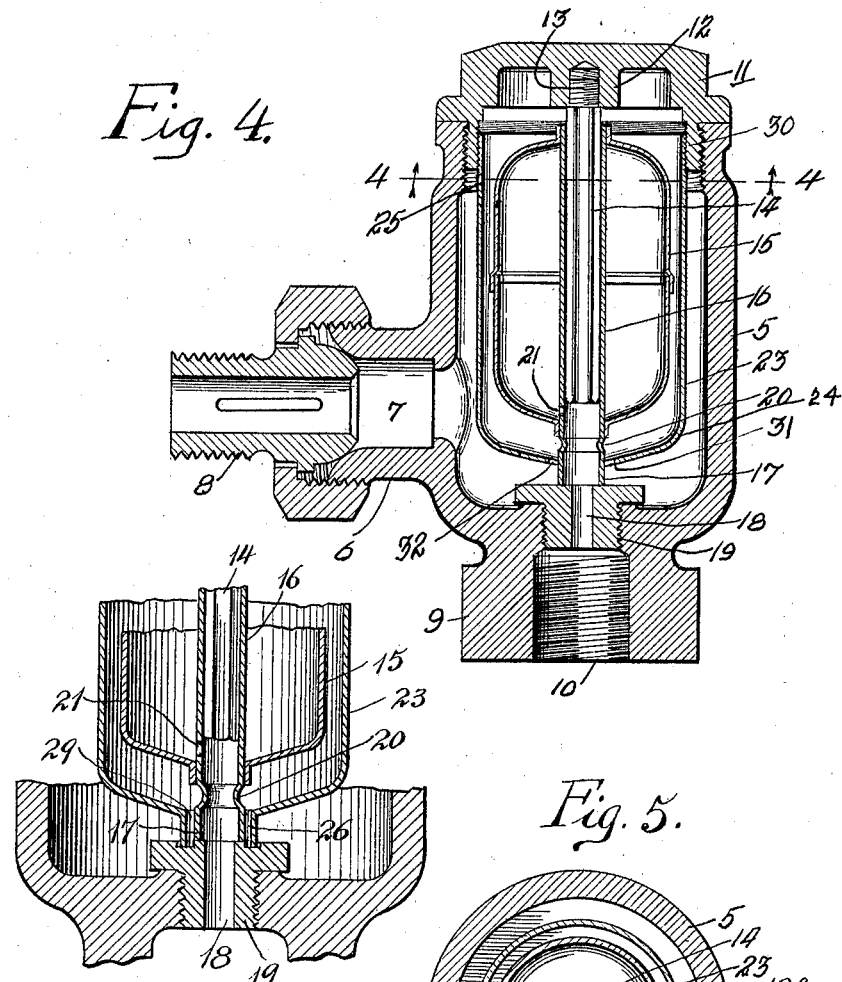

UNITED STATES PATENT OFFICE.

FRED W. LEUTHESSER, OF CHICAGO, ILLINOIS.

STEAM, AIR, AND WATER TRAP VALVE.

1,037,157.   Specification of Letters Patent.   Patented Aug. 27, 1912.

Application filed February 8, 1910. Serial No. 542,801.

*To all whom it may concern:*

Be it known that I, FRED W. LEUTHESSER, a citizen of the United States, residing at Chicago, in the county of Cook and State of Illinois, have invented certain new and useful Improvements in Steam, Air, and Water Trap Valves, of which the following is a specification.

The present invention relates to a valve for use with steam heating systems, either vacuum, gravity, or drain; and is attached to the discharge end of the radiator and to the return pipe of the system; and when attached permits air and water of condensation to be drawn off from the radiator without undue waste of steam.

One object of the present invention is to arrange a shell within the chamber of the casing so as to surround the float contained therein, and have the shell serve as a shield to prevent the inrushing volume of water, entering through the inlet in the casing, from acting directly upon the float. An advantage of this arrangement is that the float operates in a still body of water, so that its rise and fall is practically noiseless. A further advantage is that the float is not subjected to the motor action of the water, which would tend to deflect it from its normal course of movement. Another object of the invention is to have the parts within the chamber of the casing in such co-relation to one another that when the cap or cover of the casing is removed, all of the parts which are not attached to the body of the casing will be withdrawn from the interior of the casing with the removal of the cap or cover, thus making these parts easily accessible for the purpose of cleaning or repairing.

Another object of the invention is to construct a float with a tube and a guide member, and form an opening in the tube which will communicate with the interior of the float and serve as an outlet for any water or air which may accidentally or otherwise penetrate into the interior of the float.

A further object is to construct a plurality of unimpeded air passages, preferably vertically extending, between the guide member and the tube, so that air may pass downward between these members with a direct flow.

A further object is to construct the float tube so that the float can only be inserted into the casing in one way, its insertion in a reversed condition being impossible.

The invention consists in the features of construction and combination of parts hereinafter described and claimed.

Figure 1:
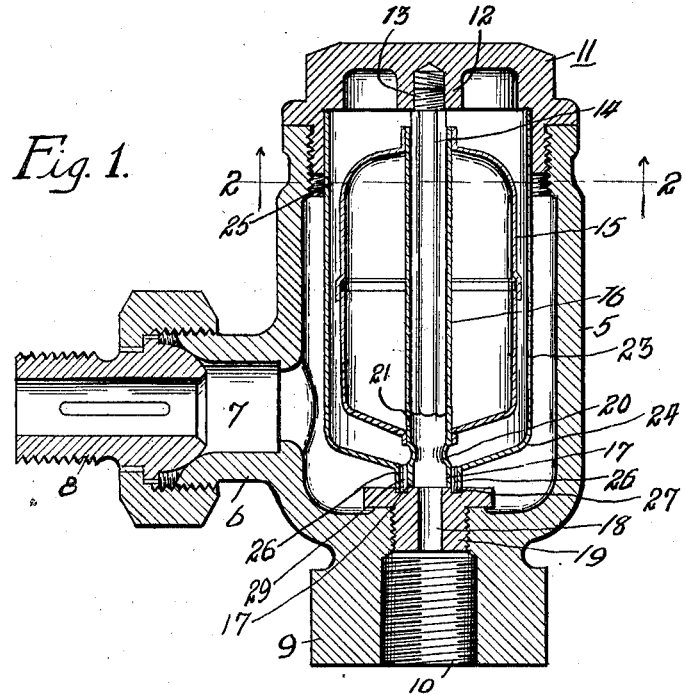
Figure 2:
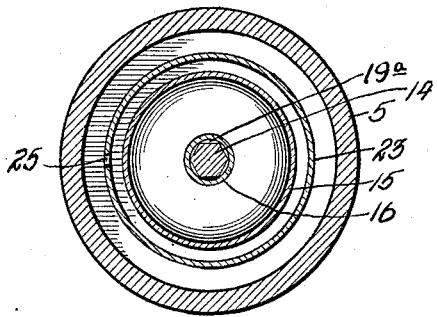
Figure 3:
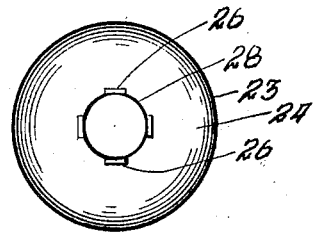

In the drawings, Figure 1 is a sectional elevation of the valve casing and interior mechanism; Fig. 2 is a section on line 2—2 of Fig. 1, looking in the direction of the arrow; Fig. 3 is a bottom view of the shell; Fig. 4 is a sectional elevation of a modified form of construction; Fig. 5 is a section on line 5—5 of Fig. 4, looking in the direction of the arrow and Fig. 6, an enlarged view of the lower end of the valve shown in Fig. 1.

In the form shown in Fig. 1, the mechanism is inclosed within a casing 5, usually cylindrical in formation and provided with a nipple 6 having therein a water inlet passage 7. The nipple is provided with a suitable coupling 8 for attaching the valve to the radiator. The casing is further provided with a downwardly extending stem 9 having a water discharge opening 10 therein; and screw-threaded into the upper end of the casing is a cap or cover 11, formed with a depending boss 12, into which is entered the screw-threaded end 13 of a guide member 14. A closed float 15 is located within the chamber of the casing, and has a central vertical tube 16 extending therethrough. The guide member, as shown, is in the form of a polygon in cross section, and depends downwardly and is entered into the central circular tube 16, the lower end 17 of which surrounds a discharge port 18 for water and air, formed in a shouldered valve plug 19, screw-threaded into the discharge passage 10.

By referring to Fig. 2, it will be seen that the difference in configuration between the outer face of the guide member 14 and the inner face of the tube 16 will produce, when the guide member is inserted into the tube, a plurality of vertically extending unimpeded air passages 19$^a$, which will serve to conduct the air from the interior of the casing to the discharge opening. These air passages, being unimpeded throughout their length, will permit the air to pass therethrough in a direct line of flow downward. The tube is further provided, adjacent to its lower end, with an inwardly extending bead 20, making this portion of the tube smaller than the guide member and forming means for preventing placing the float into the casing in a reversed position from that which it should occupy. The tube 16 is also provided with an opening 21, at a point adjacent to the lower end of the float, which opening permits any air or water that may accidentally or otherwise gather in the interior of the float, to pass out therefrom to the discharge opening.

The float 15 is a closed float, and, as shown, is formed in two sections, with its upper and lower ends rounded. Entirely surrounding the float 15 is a shell 23, which is formed to have its upper end fit close against the inner wall of the cap or cover, which will enable the shell to be removed from the cap when desired, but will prevent the separation of the shell from the cap at all times, when such separation is not desired. The lower end 24 of the shell is rounded and serves as a shield to prevent the inrushing water from acting directly against the float. The shell is formed with an air eduction opening 25 adjacent to its upper end, and has formed upon its lower end 24 a plurality of downwardly depending lugs 26 which enter a circular groove 27 formed in the upper face of the valve plug 19. The depending lugs surround an opening 28 formed in the bottom of the shell, through which the tube 16 passes. The hole, however, is larger in diameter than the diameter of the tube, so that a space is provided serving as a water inlet opening 29.

The construction shown in Fig. 4 has the inner face of the depending flange of the cap or cover provided with an interior screw-thread 30, and the shell 23 is screw-threaded at its upper end to engage the screw-thread 30 on the cap or cover 11 and attach the shell to the cap or cover. The shell 23, at its rounded lower end 24, is provided with an opening 31 through which the tube 14 passes. The diameter of the opening 31 is larger than the diameter of the tube 14, so that an opening 32 is provided, which serves as a water inlet opening.

The operation of the two structures is identical and is as follows: When steam is admitted to the radiator, air will be forced out therefrom and be conducted through the air passages 19ª into the discharge passage 10. As water of condensation accumulates in the radiator, it will pass through the inlet 7 into the chamber of the valve casing and through the water inlet passages of the shell to rise around the float. As shown in the drawings, the water inlet of the shell is out of direct communication with the water inlet in the valve casing, so that the semi-circular lower end of the shell will act as a shield to prevent the inrushing water from coming in direct and forcible contact with the float. The water, by the time it reaches the float, will be stilled, so that the float will be surrounded by and will move in a still body of water. After the initial volume of water has passed into the casing, a constant seal will be maintained at the lower part of the casing, through which the air must pass to reach the air eduction opening of the shell; and as the steam will contain more or less moisture it will not readily pass through the air openings, so that the water in the casing will act in conjunction with the air openings to prevent an undue amount of steam from passing out of the radiator into the discharge passage. When the water of condensation has risen to a predetermined height, the float will be raised, carrying with it the tube and permitting the water to flow out of the discharge passage into the return or discharge pipe of the heating system.

As will be seen from a study of the drawings, when the cap or cover is removed from the casing, the shell, float, tube, and guide member will all be removed therewith from the interior of the casing. This enables the casing and valve mechanism to be readily cleaned, and permits easy access thereto for the purpose of making repairs, etc.

I claim:

1. In a valve of the class described, the combination of a casing provided with an inlet passage and a discharge passage, a cap or cover for closing the upper end of the casing, a float within the casing for governing the discharge passage, a shell dividing the interior of the casing into a water inlet chamber and a float chamber, said shell surrounding the float and having its lower end underlying the lower end of the float, said shell being provided with an unrestricted air inlet opening near its upper end and having its lower end provided with a centrally located opening constituting a water inlet to the float chamber, said shell having an imperforate body between said openings, means for centering said shell with respect to the discharge passage and for spacing the lower end of the shell away from the floor of the casing to allow unrestricted communication between the water inlet chamber and the discharge passage of the casing, a hollow tube extending through said float and secured thereto, the lower end of the tube, when the float is in normal position, cutting off communication between the interior of the casing and the discharge passage, a fixed guide member entering into said tube, said tube having a passage for air formed between the exterior face of the guide member and the interior face of the tube for permitting air to pass from the interior of the casing into the discharge passage, said tube extending through said opening in the lower end of the shell and restricting communication between the float chamber and the discharge passage and the float chamber and water inlet chamber, substantially as described.

2. In a valve of the class described, the combination of a casing provided with an inlet passage and a discharge passage, a cap or cover secured to the upper end of the casing, a float within the casing for governing the discharge passage, a depending shell surrounding the float with its lower end underlying the lower end of the float, said shell being provided with an air inlet opening near its upper end and provided with a water inlet opening below the line of flotation of the inclosed float, and having an imperforate body between said openings, said shell extending above and below the ends of the float and having its upper end in close contact with the inner side wall of the cap, and having its lower end terminating clear of the floor of the valve casing, furnishing a passageway for water below the shell, a hollow tube extending through said float and secured thereto, the lower end of the tube when the float is in normal position cutting off communication between the interior of the casing and the discharge passage, a fixed guide member secured to said cap or cover and entering said tube, said guide member being in the form of a polygon in cross-section and furnishing a plurality of unrestricted vertically extending air passages between the exterior face of the guide member and the interior face of the tube for permitting air to pass from the interior of the casing into the discharge passage with a direct downward flow, and members carried by the shell, spaced apart, and serving to space the lower end of the shell away from the floor of the float chamber, and also serving to center the lower end of the shell with respect to the discharge passage, substantially as described.

3. In a valve of the class described, the combination of a casing provided with an inlet passage and a discharge passage, a cap or cover for closing the upper end of the casing, a float within the casing for governing the discharge passage, a shell surrounding the float and dividing the interior of the casing into a water inlet chamber and a float chamber, said shell having an air inlet opening above the line of flotation and a centrally located opening in its lower wall, furnishing a water inlet opening to the float chamber, said shell having an imperforate body between said openings, means for centering said shell with respect to the discharge passage and for spacing the lower end of the shell away from the floor of the casing to allow unrestricted communication between the water inlet and discharge passage, a hollow member depending from the lower end of the float and acting as a valve member to control communication between the interior of the casing and the discharge passage, means for guiding said float in its movements, said valve member extending through said opening in the lower end of thet shell and restricting communication between the float chamber and inlet passage, and means for discharging air from the casing, substantially as described.

4. In a valve of the class described, the combination of a casing having a chamber provided with an inlet passage and a discharge passage, a cap or cover secured to the upper end of the casing, a float within the casing for governing the discharge passage, a depending shell surrounding said float and having its upper end in close contact with the inner wall of the cap, and having its lower end underlying the lower end of the float, said shell being provided near its upper end with an air eduction opening and provided with a central water inlet opening in its bottom, and having an imperforate body between said openings, a tube extending through and fixed to said float and having its lower end surrounding the discharge passage when the float is in normal position, said tube having a less diameter than the diameter of the central water inlet opening of the shell and extending through and reducing the size of said central water inlet opening, a fixed guide member entered into said tube, a plurality of lugs depending from the lower end of the shell and spaced away from one another to provide a clearance therebetween, and serving to center the lower end of the float with respect to the discharge passage, and also serving to space the lower end of the shell away from the floor of the valve casing, and means for discharging air from the casing, substantially as described.

5. In a valve of the class described, the combination of a casing provided with an inlet passage and a discharge passage, a cap secured to the upper end of the casing, a valve plug entered into the floor of the casing and provided with a discharge port communicating with the discharge passage in the casing, said plug having a groove formed in its upper face, a float within the casing, for governing the discharge passage, a shell surrounding said float and provided with an air eduction opening near its upper end, and with a water inlet opening below the line of flotation, downwardly depending lugs extending from the bottom of said shell and entering said groove in the upper face of the valve plug, said shell having its upper end in close contact with the inner wall of the shell, and having its lower end terminating clear of the floor of the casing, a hollow tube extending through said float and secured thereto, the lower end of the tube, when the float is in normal position, cutting off communication between the interior of the casing and the discharge passage, a fixed guide member entered into said tube, and passages for air between the exterior face of the guide member and the interior face of the tube, for permitting air to pass from the interior of the casing into the discharge passage, substantially as described.

6. In a valve of the class described, the combination of a casing provided with an inlet passage and a discharge passage, a cap for the upper end of the casing, a valve plug entered into the floor of the casing and provided with a discharge port communicating with the discharge passage in the casing, said plug having a groove formed in its upper face, a float within the casing, for governing the discharge passage, a shell surrounding said float and provided with an air eduction opening near its upper end, and with a water inlet opening below the line of flotation, downwardly depending lugs extending from the bottom of said shell and entering said groove in the upper face of the valve plug, said shell having its upper end in close contact with the inner wall of the shell, and having its lower end terminating clear of the floor of the casing, a hollow tube extending through said float and secured thereto, the lower end of the tube, when the float is in normal position, cutting off communication between the interior of the casing and the discharge passage, a fixed guide member secured to said cap or cover, said guide member being in the form of a polygon in cross section and furnish a plurality of unrestricted vertically extending air passages between the exterior face of the guide member and the interior face of the tube, for permitting air to pass from the interior of the casing into the discharge passage with a direct flow downward, substantially as described.

7. In a valve of the class described, the combination of a casing provided with an inlet passage and a discharge passage, a cap secured to the upper end of the casing, a valve plug entered into the floor of the casing and provided with a discharge port communicating with the discharge passage in the casing, said plug having a groove formed in its upper face, a float within the casing, for governing the discharge passage, a shell surrounding said float and provided with an air eduction opening near its upper end, and with a water inlet opening below the line of flotation, downwardly depending lugs extending from the bottom of said shell and entering said groove in the upper face of the valve plug, said shell having its upper end in close contact with the inner wall of the shell, and having its lower end terminating clear of the floor of the casing, a hollow tube extending through said float and secured thereto, the lower end of the tube, when the float is in normal position, cutting off communication between the interior of the casing and the discharge passage, a fixed guide member entered into said tube, air passages formed between the exterior face of the guide member and the interior face of the tube, for permitting air to pass from the interior of the casing into the discharge passage, and an inwardly extending abutment formed adjacent to the lower end of the tube, for insuring the correct insertion of the float into the casing, substantially as described.

8. In a valve of the class described, the combination of a casing having a chamber provided with an inlet passage and a discharge passage, a cap or cover secured to the upper end of the casing, a valve plug entered into the floor of the casing and provided with a discharge port communicating with the discharge passage, said plug having a groove formed in its upper face, a float within said casing, for governing the discharge passage, a shell surrounding said float and provided near its upper end with an air eduction opening, and provided in its bottom wall with a water inlet opening, downwardly depending lugs extending from the bottom of said shell and entering the groove in the upper face of said plug, said shell extending beyond the ends of said float and having its upper end in close contact with the inner wall of the cap and its lower end terminating clear of the floor of the casing, a hollow tube extending through said float and secured thereto, the lower end of the float, when in normal position, cutting off communication between the interior of the casing and the discharge passage, a fixed guide member entered into said tube, and a plurality of vertically extending air passages formed between the exterior face of the guide member and the interior face of the tube, for permitting air to pass from the interior of the casing into the discharge passage with a direct flow downward, substantially as described.

9. In a valve of the class described, the combination of a casing provided with an inlet passage and a discharge passage, a cap secured to the upper end of the casing, a float within the casing for governing the discharge passage, a guide member carried by the cap, a tube extending through said float and secured thereto, the lower end of the tube surrounding the discharge passage, air passages formed between the outer face of the guide member and the inner face of the tube for permitting air to pass from the interior of the casing into the discharge passage, a shell within the interior of the casing extending about the side walls and lower end of the float and terminating clear of the floor of the valve casing, said shell having an air eduction opening adjacent to its upper end and a water inlet opening in its bottom through which said tube extends, the arrangement of the cap, shell, float, tube and guide member being one that, with the removal of the cap from the casing, all of the said parts will be removed from the interior of the casing, and members carried by the shell spaced apart and serving to space the lower end of the shell away from the floor of the float chamber, and also serving to center the lower end of the shell with respect to the discharge passage, substantially as described.

10. In a valve of the class described, the combination of a casing provided with an inlet passage and a discharge passage, a cap or cover secured to the upper end of the casing, a float within the casing for governing the discharge passage, a shell surrounding the float and having its lower end underlying the lower end of the float, said shell being provided with an unrestricted air inlet opening near its upper end and provided with a water inlet opening below the line of flotation of the inclosed float, said shell having an imperforate body between said openings, the upper end of the shell having close contact with the inner side wall of the cap and its lower end terminating clear of the floor of the valve casing, thereby furnishing an unrestricted passageway for water below the shell, a hollow tube extending through said float and secured thereto, the lower end of the tube when the float is in normal position cutting off communication between the interior of the casing and the discharge passage, a fixed guide member extending into said tube, the tube having an opening to permit any water and steam which might accumulate in the interior of the float to be discharged by means of the tube, and members carried by the shell spaced apart and serving to space the lower end of the shell away from the floor of the float chamber, and also serving to center the lower end of the shell with respect to the discharge passage, substantially as described.

11. In a valve of the class described, the combination of a casing having a float chamber, said casing being provided with a water inlet passage and a water outlet passage, a float within the chamber controlling the water outlet passage, a vertical tube centrally extending through the float, a shell within the chamber and surrounding the float with its lower end underlying the float, said shell being provided with an air inlet opening adjacent to its upper end and provided with a central opening for the passage of the float tube and furnishing a water inlet opening to the interior of the shell, the tube having a less diameter than the diameter of the opening in the bottom of the shell and reducing the size of said water inlet opening, and restricting the opening into the float chamber, the shell having an imperforate body between the air and water inlet openings, and the lower end of the shell terminating clear of the floor of the float chamber and furnishing an unrestricted passageway for water below the shell, the interior of the shell in conjunction with the reduced opening for water thereinto furnishing a still body of water in which the float operates, a guide stem entered into the central tube of the float, means for educting air from the interior of the casing, and means for spacing the lower end of the shell away from the floor of the casing, and for centering the shell with respect to the discharge passage, substantially as described.

FRED W. LEUTHESSER.

Witnesses:
WM. P. BOND,
FRANCES M. FROST.

Copies of this patent may be obtained for five cents each, by addressing the "Commissioner of Patents, Washington, D. C."